United States Patent Office.

J. M. GATTMAN, OF NEW YORK, N. Y.

Letters Patent No. 80,940, dated August 11, 1868.

---

IMPROVEMENT IN MANUFACTURE OF CARBONATE AND OTHER SALTS OF SODA.

---

*The Schedule referred to in these Letters Patent and making part of the same.*

---

TO ALL WHOM IT MAY CONCERN:

Be it known that I, J. M. GATTMAN, of the city, county, and State of New York, have invented a new and useful process for the Manufacture of certain Salts of Soda; and I do hereby declare that the following is a full, clear, and exact description thereof, which will enable others skilled in the art to make and use the same.

The only process employed in the manufacture of soda is that known as "Leblanc's process," in accordance to which chloride of sodium (Na Cl., common salt,) is, by means of sulphuric acid, ($SO^3$, oil of vitriol,) converted first into sulphate of soda, (Glauber salt, salt-cake, sulphate, Na O, $SO^3$,) thereby liberating and collecting the disengaged hydrochloric-acid gas into hydrochloric or muriatic acid. The salt-cake thus obtained is mixed with about its equal weight of carbonate of lime (Ca O, $CO^2$) and about fifty per cent. of coal, melted together in a reverberatory furnace, whereby the sulphate of soda is first converted into a sulphuret, which, by the lime, is decomposed into carbonate of soda and oxy-sulphuret of lime, thus: first, $2(Na O. SO^3) + 4 C = 2 Na S + 4 CO_2$; second, $2 Na S + 3 (Ca O, CO^2) = 2 (Na O, CO^2) + (Ca O, 2 Ca S)$ and $CO^2$.

In lixiviating, the water dissolves the carbonate of soda, and the oxy-sulphuret of lime remains, and is thrown away, and with it all the sulphuric acid which was originally employed in the conversion of the salt into sulphate.

This loss of sulphuric acid, (at least one equivalent for every equivalent of salt,) and the large residue of the useless oxy-sulphuret of lime, are the great drawbacks in this ingenious and only process in the manufacture of soda.

Different modes have, every now and then, been devised, either to utilize the residue of the oxy-sulphuret, as such, or to regain the sulphur therefrom, and to employ it again for the production of sulphuric acid, but none have been found practical enough to be employed by the manufacturer.

According to my improved process, the sulphuric acid, as well as the lime, is entirely done away with, and the loss of costly material, as well as the accumulation of an obnoxious residue, is entirely prevented.

To enable others skilled in the art to use my improvement, I will now describe it.

Chloride of sodium (common salt) and finely-powdered chrome-iron ore (in the main, $Fe O, Cr_2 O_3$) are, in equal weights, intimately mixed together, heated to redness in a reverberatory furnace, and subjected to a current of steam, superheated preferred.

The hydrogen of the steam combines with the chlorine of the salt to hydrochloric-acid gas, which combines with the oxide of iron of the chrome-iron ore into chlorine of iron, which, being volatile, is driven off. The oxygen of the steam unites with the sodium to form soda; at the same time the sesquioxide of chromium is converted into chromic acid, which combines with the soda to chromate of soda, thus: $4 Na Cl + 2 (Fe O, Cr^2 O^3) + 4 HO = 4 (Na O, Cr O^3) + Fe^2 Cl^3 + H Cl$.

When the charge is thoroughly fused, which may be tested by dissolving a little of it in water, when the solution must be of a clear, bright yellow, without any tinge in green or blue, it is withdrawn. When lixiviated with water, chromate of soda will dissolve, which, being acidulated either with acetic acid or nitric acid, and evaporated, will crystallize into bichromate of soda, and may be used in all respects like the bichromate of potash.

But for the manufacture of carbonate of soda, the charge of the above melting process is powdered, and mixed with from fifteen to twenty per cent. of coal, and again subjected to a bright red heat, (but without steam,) whereby the chromic acid of the chromate of soda is again reduced into sesquioxide of chromium, and the soda converted into carbonate of soda, thus: $2 (Na O, Cr O^3) + 4 C, = 2 (Na O, CO^2) + Cr^2 O^3$.

When the reaction has ceased, (which also can be tested by dissolving a little of the melted mass in water, when a colorless solution must be obtained,) the charge is withdrawn, left to cool, then powdered and dissolved in water, which will extract the carbonate of soda, and leaves the sesquioxide of chromium as insoluble behind.

The same sesquioxide of chromium ($Cr^2 O^3$) thus obtained, when again mixed with salt in the proportion of one hundred of the former to one hundred and sixty or one hundred and seventy to the latter, and treated in the same way in connection with steam, (as described above, when the chrome-iron ore was used,) is again converted into chromate of soda, viz, $Cr_2O^3 + 2\,Na\,Cl + 3\,HO = 2\,(Na\,O, Cr\,O^3) + 2\,H\,Cl + H$, and hydrochloric-acid gas, which passes off, and is condensed into muriatic acid in the usual way. The chromate of soda thus obtained is again reduced into sesquioxide of chromium, which again answers the same purpose for an indefinite time.

The smelting process will be greatly facilitated, when, to the mixture of salt and chrome-iron ore, (as in the first place,) from ten to fifteen per cent. of nitrate of soda, (Chili saltpetre,) or to the mixture of salt and sesquioxide of chromium, (as in the second place,) from fifteen to twenty per cent. of black oxide of manganese would be added, as oxygen would be more readily furnished, to convert the chromic oxide into chromic acid.

Having thus described my invention, I claim as new, and desire to secure by Letters Patent—

The manufacture of chromate of soda and the carbonate of soda, by the process substantially as described.

J. M. GATTMAN.

Witnesses:
    WM. F. McNAMARA,
    ALEX. F. ROBERTS.